(12) United States Patent
Deng et al.

(10) Patent No.: US 7,690,456 B2
(45) Date of Patent: Apr. 6, 2010

(54) POWER GENERATION SYSTEM SUITABLE FOR HYBRID ELECTRIC VEHICLES

(75) Inventors: Duo Deng, Canton, MI (US); Kent M. Harmon, Troy, MI (US); John D. Franklin, Ypsilanti, MI (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 850 days.

(21) Appl. No.: 11/472,486

(22) Filed: Jun. 20, 2006

(65) Prior Publication Data

US 2007/0012492 A1 Jan. 18, 2007

Related U.S. Application Data

(60) Provisional application No. 60/693,370, filed on Jun. 22, 2005.

(51) Int. Cl.
    *B60W 10/26* (2006.01)
(52) U.S. Cl. .............................. 180/65.265; 180/65.29; 903/930
(58) Field of Classification Search .............. 180/65.21, 180/65.265, 65.27, 65.28, 65.285, 65.29, 180/65.31; 903/930; 701/22
See application file for complete search history.

(56) References Cited

U.S. PATENT DOCUMENTS

| | | | | |
|---|---|---|---|---|
| 4,830,412 A | * | 5/1989 | Raad et al. ................... 290/31 |
| 5,587,647 A | * | 12/1996 | Bansal et al. ................. 322/45 |
| 5,828,199 A | * | 10/1998 | Tajima et al. ................. 318/779 |
| 6,281,660 B1 | * | 8/2001 | Abe ............................. 320/103 |
| 6,338,391 B1 | * | 1/2002 | Severinsky et al. ....... 180/65.23 |
| 6,396,161 B1 | | 5/2002 | Crecelius et al. .......... 290/36 R |
| 6,462,429 B1 | * | 10/2002 | Dhyanchand et al. ......... 290/31 |
| 6,466,465 B1 | * | 10/2002 | Marwali ....................... 363/41 |
| 6,484,830 B1 | * | 11/2002 | Gruenwald et al. ..... 180/65.245 |
| 6,876,176 B2 | | 4/2005 | Stefanovic et al. ............. 322/20 |
| 6,984,957 B2 | | 1/2006 | Tajima et al. ................. 318/700 |
| 7,057,371 B2 | * | 6/2006 | Welchko et al. ......... 318/400.27 |
| 7,100,717 B2 | * | 9/2006 | Stancu et al. ............... 180/65.1 |
| 7,104,920 B2 | * | 9/2006 | Beaty et al. ..................... 477/5 |
| 7,105,938 B2 | * | 9/2006 | Edelson ..................... 290/40 A |
| 7,119,454 B1 | * | 10/2006 | Chiao .......................... 307/9.1 |
| 7,196,493 B2 | * | 3/2007 | McGee et al. ................ 320/104 |
| 7,231,994 B2 | * | 6/2007 | Buglione et al. .......... 180/65.31 |
| 7,330,016 B2 | * | 2/2008 | Colley .......................... 322/47 |
| 2005/0109550 A1 | | 5/2005 | Buglione et al. ........... 180/65.2 |

FOREIGN PATENT DOCUMENTS

JP 6-84185 12/1994

* cited by examiner

*Primary Examiner*—S. Joseph Morano
*Assistant Examiner*—John D Walters

(57) ABSTRACT

A switch/power conditioning module may be added to a hybrid vehicle to selectively supply power from an AC power bus to a load, providing on-vehicle standby power generating capability with a minimum of added hardware and/or when the vehicle is stationary.

19 Claims, 8 Drawing Sheets

POWER GENERATION SYSTEM SUITABLE FOR HYBRID ELECTRIC VEHICLES

BACKGROUND OF THE INVENTION

1. Field of the Invention

This disclosure generally relates to the field of power generation, and more particularly to power generation in hybrid electric vehicles such as vehicles employing electric machines such as motors and/or generators, in conjunction with engines such as internal combustion engines.

2. Description of the Related Art

Hybrid electric vehicles take a variety of forms, but typically include a power generating device, power storage device, and an electric machine. The power generating device may, for example, take the form of an internal combustion engine. The power storage device may, for example, take the form of an array of chemical battery cells or super- or ultra-capacitors, a flywheel, or other power storage device. The electric machine may take the form of an electric motor and/or generator. For example, the electric machine may take the form of an alternating current (AC) electric motor.

Hybrid electric vehicles may employ a variety of power train architectures. For example, the hybrid electric vehicle may employ a series configuration including a generator that produces power for supply to an electric traction motor and to charge the power storage device. The electric traction motor provides the primary propulsion for the vehicle, and may, for example, be coupled to a set of wheels. Alternatively, the hybrid electric vehicle may employ a parallel configuration that provides the primary propulsion via a direct mechanical connection with an internal combustion engine, as well as via an electric traction motor. Other hybrid electric vehicle power train architectures are known, including combinations of the basic series and parallel architectures discussed above.

A number of approaches have been proposed for generating AC power onboard a hybrid electric vehicle. One approach employs a low power inverter to invert low voltage (e.g., 12V DC) direct current (DC) to alternating current (AC) of an appropriate frequency (e.g., 60 Hz AC). Such an approach is very limited in power output, and adds a large load to the low voltage (e.g., 12V DC) system of the vehicle. Another approach employs an onboard auxiliary generator and a separate secondary internal combustion engine to generate higher levels of AC power. Drawbacks to such an approach include the costs and complexity associated with the additional secondary internal combustion engine. Drawbacks to such an approach also include the low efficiency associated with secondary engines, as well as the minimal accommodations typically made to handle the noise and pollutants produced by secondary engines. A further approach employs an onboard generator driven via a power take off from the primary internal combustion engine. Drawbacks associated with such an approach include the cost and complexity associated with an additional generator. Drawbacks associated with such an approach also include the occupation of a power take off location, as well as the decrease in efficiency attributable to losses associated with the power take off mechanism.

It would be beneficial to produce AC power onboard a hybrid electric vehicle for use when the vehicle is stationary, and/or to produce AC power onboard a hybrid electric vehicle with a minimum of added hardware and other disruption to the hybrid vehicle architecture.

BRIEF SUMMARY OF THE INVENTION

In at least one embodiment, a power system for a hybrid electric vehicle comprises an electric machine operable to propel the hybrid electric vehicle in at least one operating mode, and to produce AC power in at least one operating mode; an AC power bus coupled to the electric machine to carry the AC power; an engine operable to propel the hybrid electric vehicle, and operable to drive the electric machine in at least one operating mode; a power storage device operable to store and release DC electrical power; a DC power bus electrically coupled to the power storage device to carry the DC power; a first DC/AC power converter electrically coupled between the DC power bus and the AC power bus, the first DC/AC power converter operable to transform the DC power carried by the DC power bus to AC power carried by the AC power bus; and a switch/power conditioning module electrically couplable to the AC power bus, and operable to selectively supply power from the AC power bus to a load.

In at least one embodiment, the hybrid power system may further comprise a first DC/AC power converter controller coupled to control the first DC/AC power converter in response to signals from the switch/power conditioning module. In at least one embodiment, the hybrid power system may further comprise an engine controller coupled to control the engine in response to signals from the DC/AC power converter controller.

In at least one embodiment, the switch/power conditioning module may comprise a transformer electrically couplable between the AC power bus and a set of output connectors to which the load is selectively connectable. In at least one embodiment, the transformer is a Delta-Wye transformer comprising a set of primary windings in a Delta configuration and a set of secondary windings in a Wye configuration.

In at least one embodiment, the switch/power conditioning module further comprises a set of inductors electrically couplable between the primary windings of the transformer and the AC power bus. In at least one embodiment, the switch/power conditioning module further comprises a set of circuit breakers electrically couplable between the inductors and the AC power bus. In at least one embodiment, the switch/power conditioning module further comprises a set of load switches electrically coupled between secondary windings of the transformer and the set of output connectors. In at least one embodiment, the switch/power conditioning module further comprises a set of fuses electrically couplable between the set of load switches and the set of output connectors. In at least one embodiment, the switch/power conditioning module further comprises an enable/disable switch responsive to the first DC/AC power converter controller.

In at least one embodiment, hybrid power system further comprises a neutral line supplied to one of the output connectors of the set of output connectors from the transformer. In at least one embodiment, the hybrid power system further comprises a neutral line supplied to one of the output connectors of the set of output connectors from the electric machine.

In at least one embodiment, the hybrid power system further comprises an AC generator coupled to be driven via at least one of the engine and the electric machine; and an AC/DC power converter coupled between the AC generator and the power storage device, and operable to transform AC power produced by the AC generator to DC power for storage by the power storage device.

In at least one embodiment, the first DC/AC power converter is operable as an inverter. In at least one embodiment, the first DC/AC power converter is bi-directionally operable as an inverter in one mode and a rectifier in another mode.

In at least one embodiment, the hybrid power system further comprises a set of wheels; and a split gear mechanically coupling the engine and the electric machine to the set of wheels. In at least one embodiment, the hybrid power system further comprises a flex coupling set of wheels; a flex coupling member mechanically coupling the engine to the electric machine; and a transmission mechanically coupling the electric machine to the set of wheels.

In at least one embodiment, the hybrid power system further comprises a second DC/AC power converter electrically coupled between the DC power bus and the switch/power conditioning module; and a second DC/AC power converter controller coupled to control the operation of the second DC/AC power converter.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
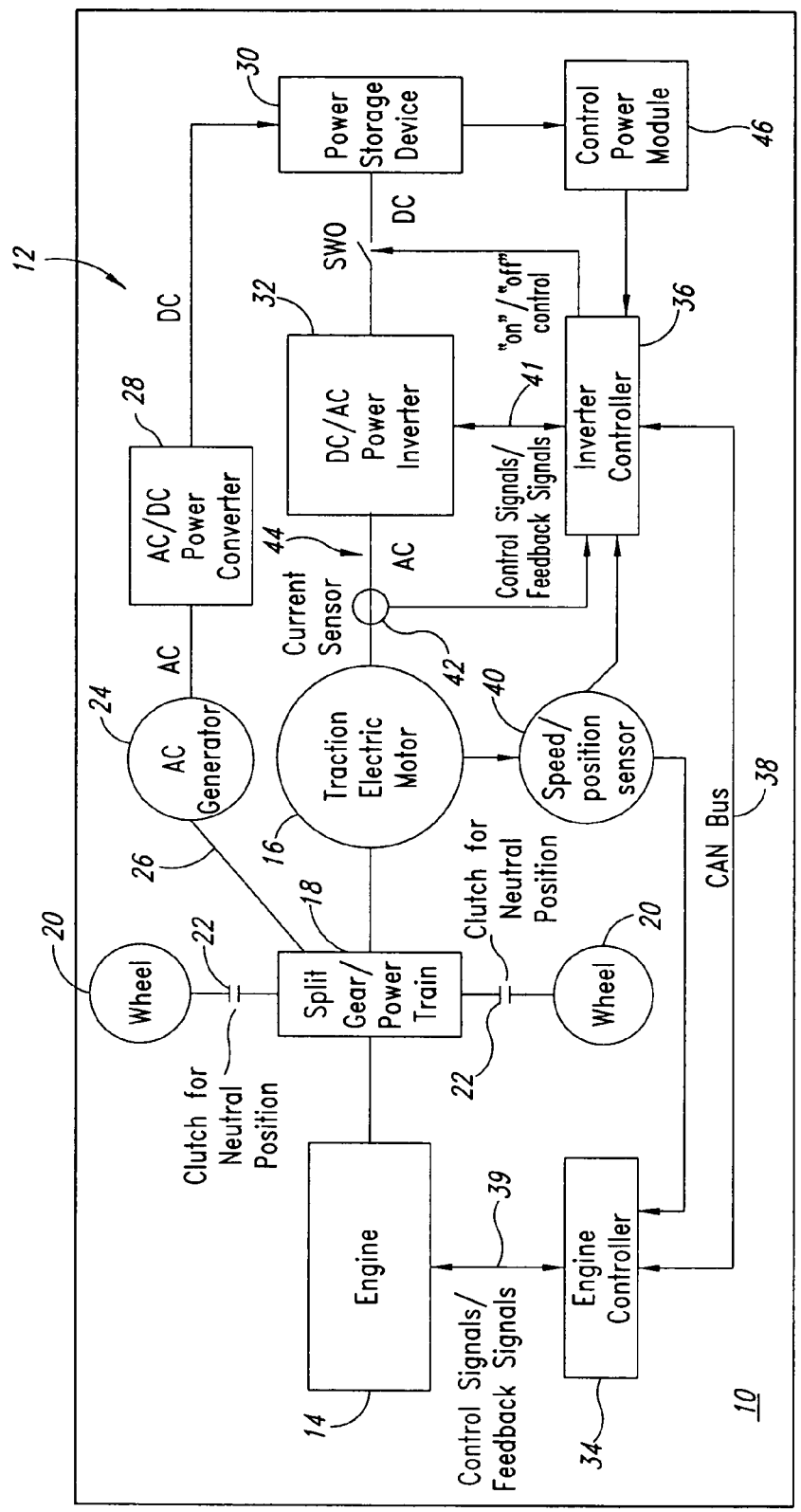
FIG. 1 is a block diagram of a conventional hybrid electric vehicle, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with internal combustion engines, cooling mechanisms, transmissions, and control subsystems such as controllers including microprocessors, digital signal processors (DSP), application specific integrated circuits (ASIC), field programmable gate arrays (FPGA) and/or memories have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

This disclosure presents new standby power generation architectures or topologies which can be used, for example, in conventional parallel hybrid vehicles. The new topologies add a Switch/Power Conditioning (SPC) module to the components of the conventional vehicle power train.

The new topologies have at least three functional differences from previous approaches. The new topologies make use of the existing prime mover (e.g. internal combustion engine) to provide the rotational energy for power generation. Some prior approaches added a secondary internal combustion engine to the hybrid vehicle to power an auxiliary generator. Some of the new topologies make use of the existing starter/generator/motor-assist unit to transform the rotational energy of the internal combustion engine directly into 60 hertz (Hz) alternating current (AC) power. Some prior approaches employed low power inverters that required the vehicle 12V alternator to transform the rotational energy of the primary internal combustion engine into 12V direct current (DC) power, which was then inverted to 60 Hz AC power. Other prior approaches employed power take off generators, adding an additional generator and voltage regulator to the vehicle, as well as a power take off mechanism to transform the rotational energy of the internal combustion engine into 60 Hz AC power. Some of the new topologies make use of a existing DC/AC power converter (e.g., inverter) to regulate the output voltage of the standby power. Prior approaches required an additional voltage regulator to control the standby power voltage.

FIG. 1 shows a hybrid electric vehicle 10 comprising a parallel topology power train system 12 of conventional design.

The power train system 12 comprises an engine 14 and an electric driving motor, such as, but not limited to, a traction electric motor 16, each coupled via a split gear/power train 18 to provide driving torque/power to one or more wheels 20. The engine 14 may take a variety of forms, for example an internal combustion engine. For high reliability, no or low maintenance, and high efficiency, the traction electric motor 16 may take the form of an AC electric motor. The power train system 12 may include a clutch 22, operable to disengage the wheels 20 from the split/gear power train 18, for example to place the power train system 12 in neutral.

An AC generator 24 is driven via a power take off 26 to produce AC charging power. A first AC/DC power converter 28 rectifies the AC charging power produced by the AC generator 24 to charge a power storage device 30 such as, but not limited to, a chemical battery or an array of chemical battery cells. A DC/AC power inverter 32 is operable to invert DC power from the power storage device 30 to supply AC power to drive the traction electric motor 16. If there is no grid-connected charger for charging the power storage device 30, all of the driving energy for the power train system 12 may come from the engine 14.

The power train system 12 also comprises a control sub-system which may include an engine controller 34, an inverter controller 36, and a controller area network (CAN) bus 38 communicatively coupling the engine controller 34 and the inverter controller 36.

The engine controller 34 is operable to control the operation of the engine 14. For example, the engine controller 34 may control the operation of one or more fuel injectors and/or valves of the engine 14. In particular, the engine controller 34 may take the form of one or more microprocessors, DSPs, ASICs, and/or FPGAs, and may include one or more memories such as random access memory (RAM) and/or read only memory (ROM). The engine controller 34 may be coupled to provide control signals to, and/or to receive feedback signals from, the engine 14 via one or more signal buses 39. The engine controller 34 may also receive signals from a speed/position sensor 40, which signals are indicative of the speed and/or position of a rotor of the traction electric motor 16.

The inverter controller 36 is operable to control operation of the DC/AC power inverter 32. For example, the inverter controller 36 may control power semiconductor switches of the DC/AC power inverter 32 to invert the power supplied from the power storage device 30 to the traction electric motor 16. In some embodiments, the inverter controller 36 may take the form of a combined vehicle/inverter controller. The inverter controller 36 may take the form of one or more microprocessors, DSPs, ASICs, and/or FPGAs, and may include one or more memories such as random access memory (RAM) and/or read only memory (ROM). The inverter controller 36 provides control signals to, and receives feedback signals from, the DC/AC power inverter 32 via one or more signal buses 41. The inverter controller 36 may also receive signals from a current sensor 42, indicative of a current on a high voltage power bus 44 supplying AC power to the traction electric motor 16 from the DC/AC power inverter 32. The high voltage AC power bus 44 may, for example, take the form of a three phase AC power bus. The inverter controller 36 may also receive signals from a control power module 46, the signals indicative of the power, voltage and/or charge levels of the power storage device 30. The inverter controller 36 is further operable to control a switch SW0 to couple and uncouple the power storage device 30 from the DC/AC power inverter 32.

Figure 2:
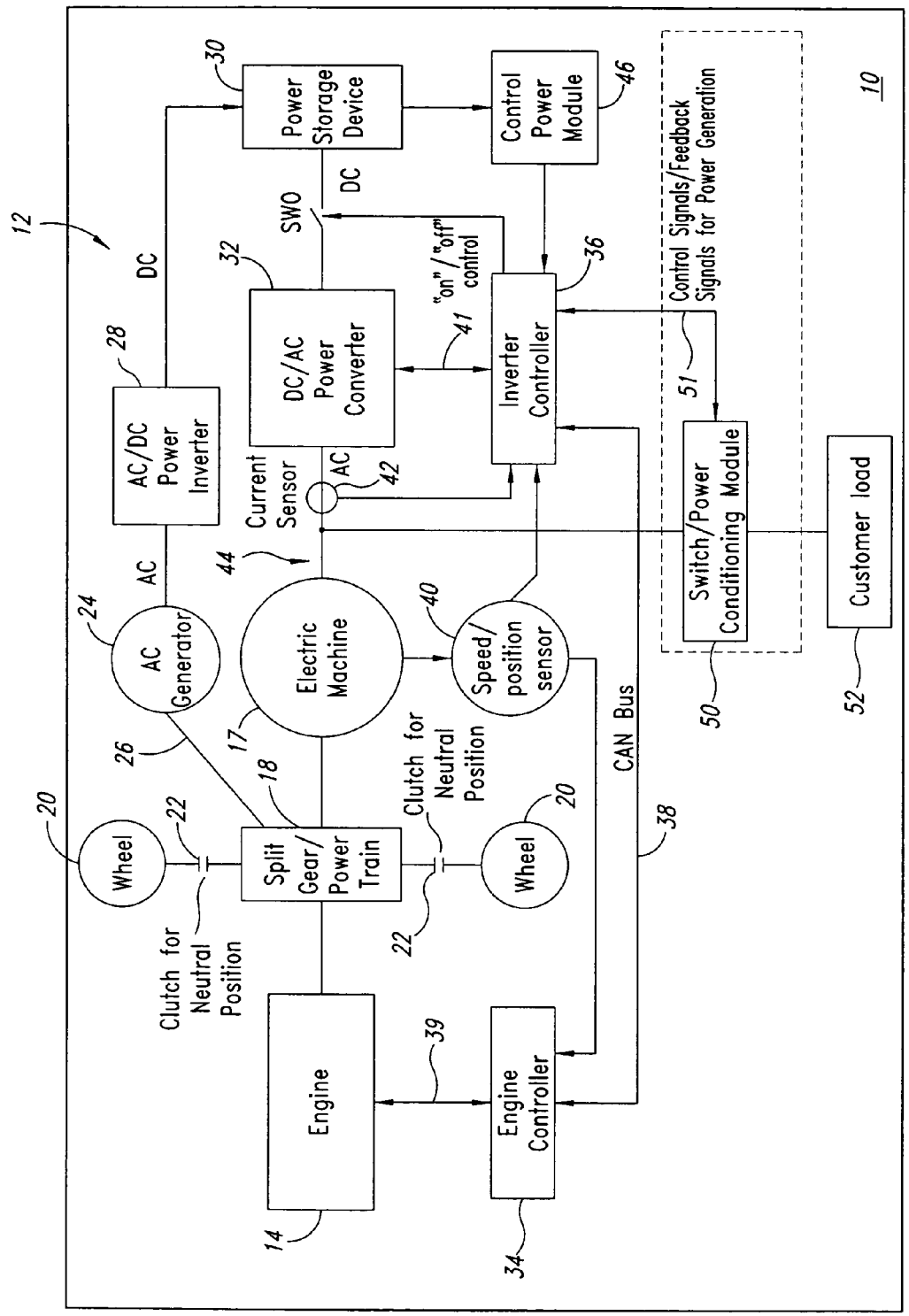
FIG. 2 is a block diagram of a hybrid electric vehicle comprising a switch/power conditioning module to provide onboard AC power, according to one illustrated embodiment, in which an engine and traction electric motor are coupled by a power train to propel the hybrid electric vehicle.

FIG. 2 shows a hybrid electric vehicle 10 employing a new standby power generation topology which can be used with conventional parallel hybrid electric vehicles topologies. The power train system 12 illustrated in FIG. 2 includes the same or similar components as the conventional power train system 12 illustrated in FIG. 1. Common structures and acts are identified by the same reference numbers. Only significant differences in operation and structure are described below.

In place of the traction electric motor 16, the embodiment illustrated in FIG. 2 employs an electric machine 17 that is operable as a generator, as well as operable as the primary drive or traction electric motor. The electric machine 17 may advantageously take the form of an induction motor (IM) or an interior permanent magnet (IPM) synchronous motor. In addition to the various components illustrated in FIG. 1, the power train system 12 illustrated in FIG. 2 includes a switch/power conditioning (SPC) module 50, as well as one or more signal lines or buses 51 providing communications between the SPC module 50 and the inverter controller 36. The SPC module 50 is electrically coupled to the high voltage AC bus 44 and is operable to supply onboard power to a load, such as customer load 52.

Figure 3:
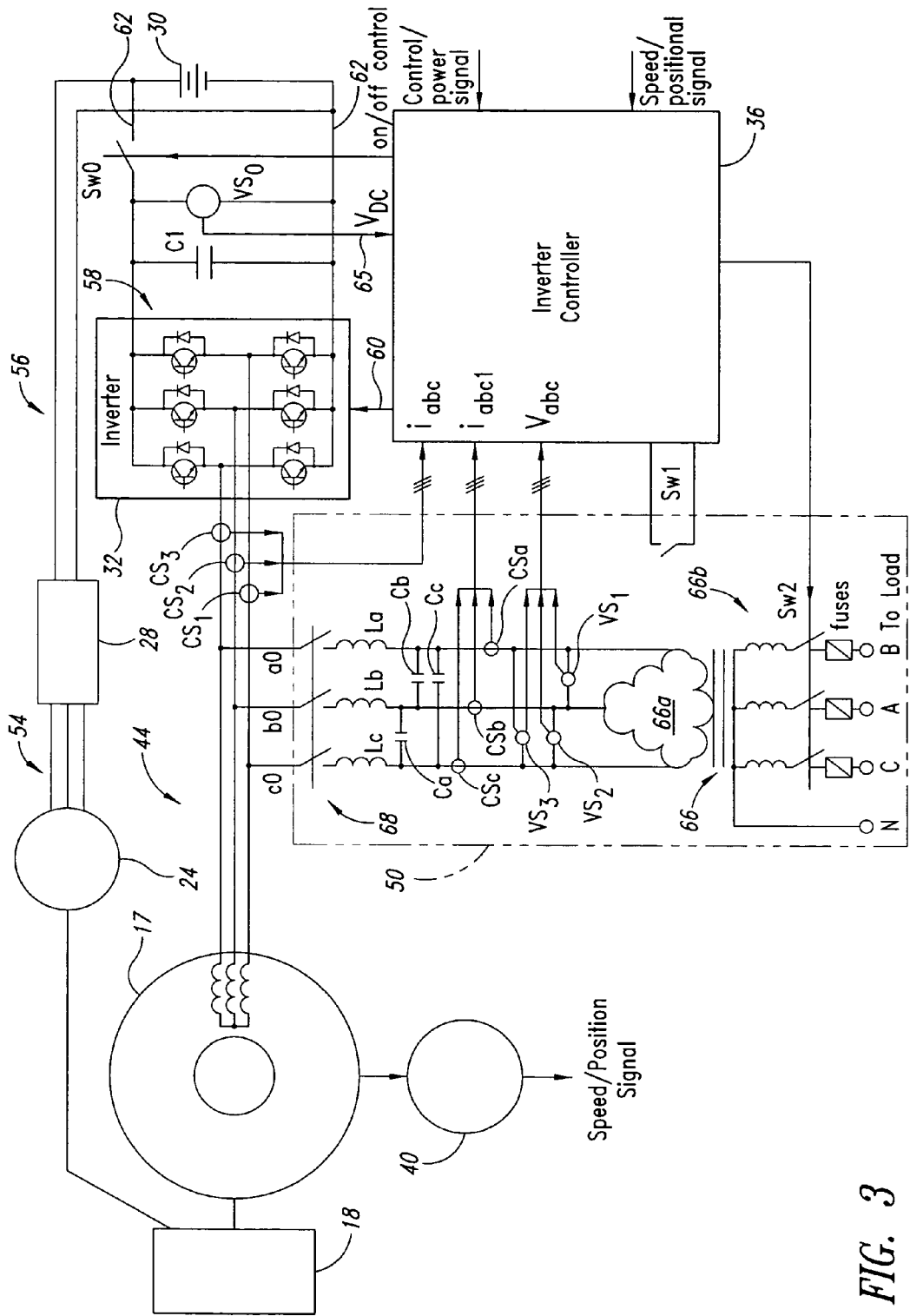
FIG. 3 is an electrical schematic diagram showing a circuit topology suitable for implementing the switch/power conditioning module of FIG. 2, according to one illustrated embodiment.

FIG. 3 shows a portion of the power train system 12 including an electrical circuit topology suitable for use in the SPC module 50 of FIG. 2, according to one illustrated embodiment.

As illustrated, the electric machine 17 may be operable as a motor in a first mode, for example a primary drive or traction motor, and may be operable as a generator in a second mode. The high voltage AC bus 44 may be a three phase power bus, and the current sensor 42 (FIG. 2) may comprise a number of separate current sensors, for example one current sensor CS1, CS2, CS3 for each phase of the three phase AC bus 44. The AC generator 24 may supply three phase AC power via an AC bus 54 to the AC/DC power converter 28, which supplies DC power via a DC bus 56 to charge the power storage device 30.

Figure 6:
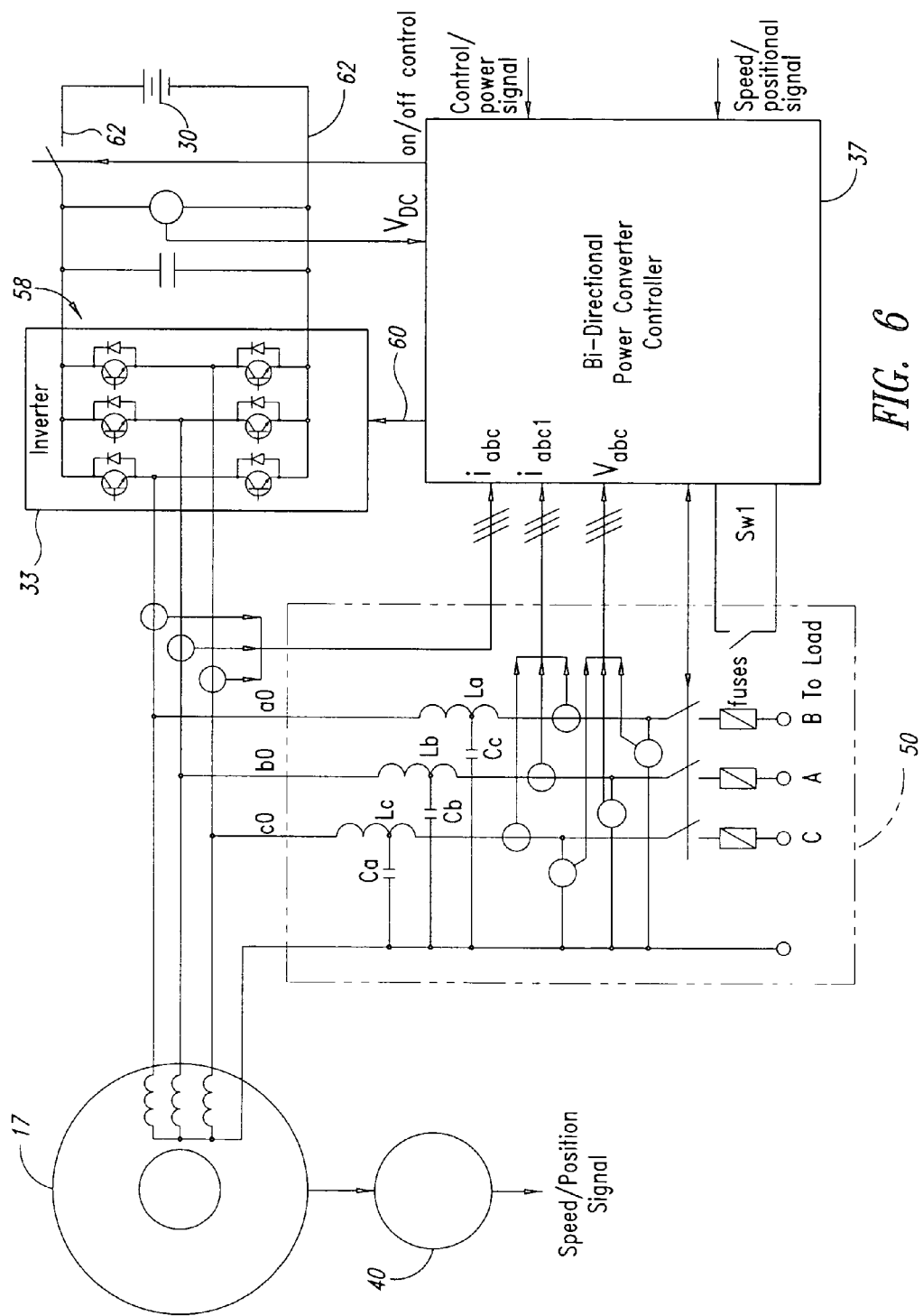
FIG. 6 is an electrical schematic diagram showing a circuit topology suitable for implementing the switch/power conditioning module of FIG. 5, according to another illustrated embodiment.

Also as illustrated, the DC/AC power inverter 32 may comprise a number of pairs (e.g., upper, lower) of power semi-conductor switches and anti-parallel diodes (collectively 58), coupled between DC voltage rails forming DC power bus 62. For example, the DC/AC power inverter 32 may comprise three pairs of power semi-conductor switches and anti-parallel diodes 58, one pair for each phase of the three phase AC power. The power semi-conductor switches may, for example, take the form of metal-oxide semiconductor switches (MOSFETs) and/or insulated gate bipolar transistors (IGBTs). The anti-parallel diodes may, for example, take the form of discrete silicon carbide diodes, or may form body diodes of the power semi-conductor switches. The power semi-conductor switches are responsive to gating signals 60 from the inverter controller 36. (DC/AC power inverter 32, in some embodiments, may be operable as a converter under the control of the bi-directional power converter controller 37 (operating in a converter and/or rectifier controller mode, as shown in FIG. 6).

A capacitor C1 may be coupled across the DC power bus 62 supplying power between the DC/AC power inverter 32 and the power storage device 30. A voltage sensor vs0 may sense or measure a voltage Vdc across the DC power bus 62, and provide signals 65 indicative of the voltage to the inverter controller 36.

The SPC module 50 comprises an enable/disable switch SW1, operable by the inverter controller 36 to selectively enable and disable the SPC module 50. The SPC module 50 comprises a transformer 66 electrically couplable between AC power bus 44 and the load 52 (FIG. 2). In particular, the transformer 66 is configured to supply onboard power to the load 52 (FIG. 2) via three phase lines A, B, C and a neutral line N. The transformer 66 may, for example, advantageously take the form of a Delta-Wye transformer. The SPC module 50 also comprises set of inductors La, Lb, Lc, one for each phase of the AC power supplied by the AC power bus 44, and electrically coupled between primary windings 66a of the transformer 66 and the AC power bus 44.

The SPC module 50 comprises a set of current sensors communicatively coupled to provide signals indicative of a measure of current to the inverter controller 36. For example, there may be one current sensor CSa, CSb, CSc, for each phase of the AC power supplied by inductors La, Lb, Lc to the primary windings 66a of the transformer 66. The SPC module 50 also comprises a set of voltage sensors communicatively coupled to provide signals indicative of a measure of voltage to the inverter controller 36. For example, there may be one voltage sensor VS1, VS2, VS3 for measuring voltage across each phase pair of the AC power. The SPC module 50 may further comprise a set of input capacitors, Ca, Cb, Cc, electrically coupled across each phase pair of the AC power.

The SPC module 50 comprises a set of ganged load contactors or switches SW2 operable to electrically couple, and uncouple, the secondary windings 66b of the transformer 66 with the load 52 (FIG. 2) in response to a signal from the inverter controller 36. The SPC module 50 optionally comprises ganged circuit breaker or contactor 68, operable to electrically couple, and uncouple, the SPC module 50 with the AC bus 44. The SPC module 50 optionally further comprises fuses, operable to electrically couple and uncouple the SPC module 50 with the load 52 (FIG. 2). For example, the SPC module 50 may include one fuse fs1, fs2, fs3 for each phase of the AC power.

Figure 4:
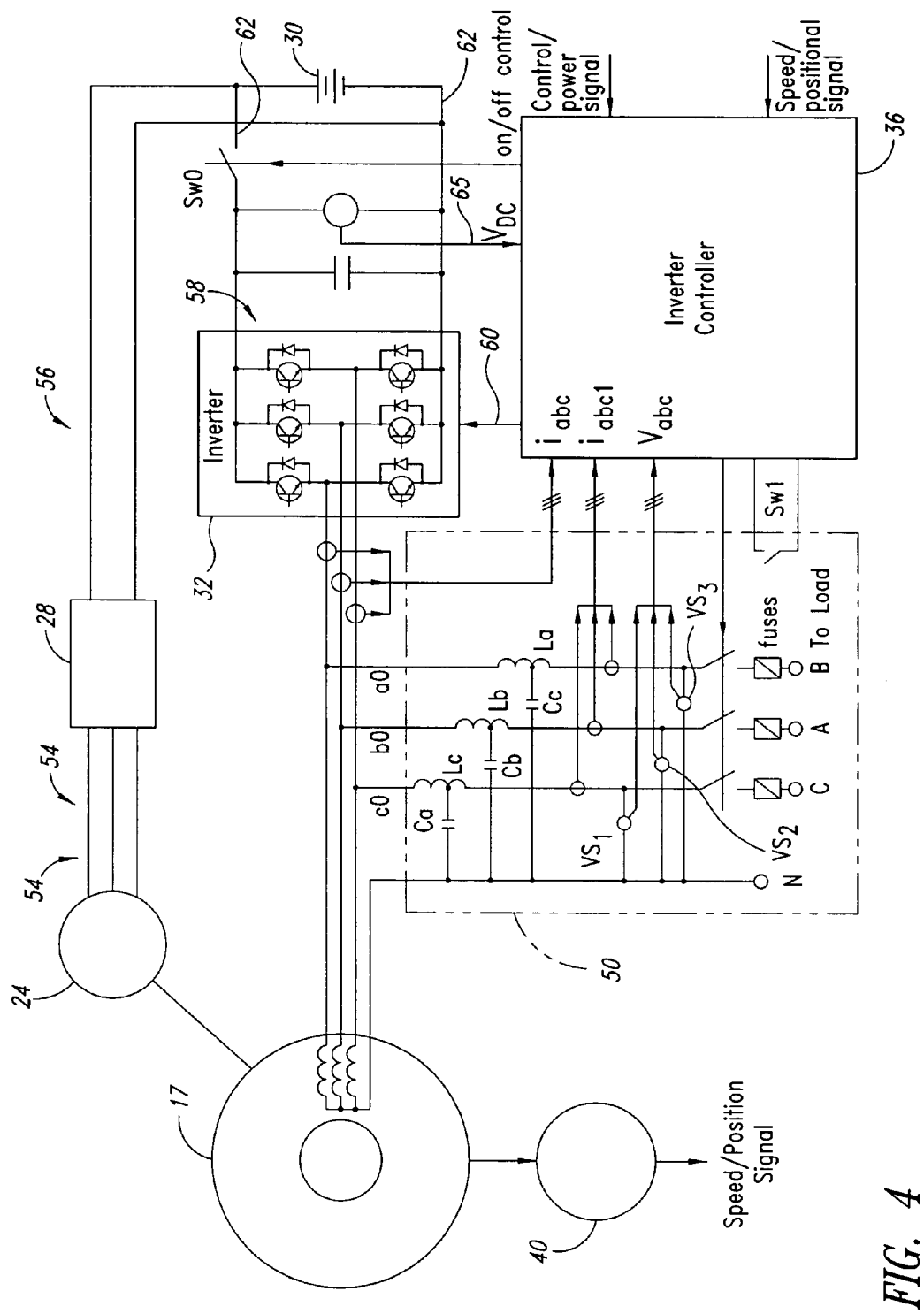
FIG. 4 is an electrical schematic diagram showing a circuit topology suitable for implementing the switch/power conditioning module of FIG. 2, according to another illustrated embodiment.

FIG. 4 shows a portion of the power train 12 including an electrical circuit topology suitable for use in the SPC module 50 of FIG. 2, according to another illustrated embodiment. The embodiment illustrated in FIG. 4 includes many of the same or similar components as the embodiment illustrated in FIG. 3. Common structures and acts are identified by the same reference numbers. Only significant differences in operation and structure are described below.

The embodiment of FIG. 4 omits the transformer 66 (FIG. 3). Consequently, the neutral line N is supplied from the electric machine 17, rather than from the transformer 66.

In contrast to the embodiment illustrated in FIG. 3, in the embodiment illustrated in FIG. 4, the capacitors Ca, Cb, Cc are electrically coupled across a respective phase and the neutral line N from the electric machine 17. The embodiment illustrated in FIG. 4 also electrically couples the voltage sensors VS1, VS2, VS3 across respective ones of the AC phases and the neutral line N.

When the hybrid electric vehicle 10 is not being driven, for example not running on a road, the power train system 12 employing the SPC module 50 may be used as a standby power generator with the potential to use the full power rating of the engine 14.

A brief description of the operation of the power train system 12 employing the SPC module 50 follows.

The hybrid electric vehicle 10 is stopped, with the key off and the manual brake set to prevent the hybrid electric vehicle 10 from moving. The clutch 22 is manually or automatically placed in a neutral position, to separate the split gear/power train 18 from wheels 20 (FIG. 2). The inverter controller 36 closes enable/disable switch SW1 (FIGS. 3 and 4) to enable the SPC module 50. The inverter controller 36 closes the switch SW0 that connects the DC/AC power inverter 32 with power storage device 30 (FIGS. 3 and 4).

The engine controller 34 (FIG. 2) disables its speed control function. The inverter controller 36 enables the gating control signals 60 for the DC/AC power inverter 32 (FIGS. 3 and 4).

The DC/AC power inverter 32 converts DC power from the power storage device 30 to AC power for the electric machine 17. In response, the electric machine 17 drives the engine 14 via the split gear/power train 18.

In response to the rotation, the engine 14 starts. If the speed of the motor shaft reaches or exceeds a motor shaft speed threshold (e.g., 300 rpm), a preset speed within a preset tolerance, or the like, the inverter controller 36 changes the operating mode for the electric machine 17 from a motoring operating mode to free spinning operating mode. As part of changing operating modes, the inverter controller 36 may perform a number of acts. For example, the inverter controller 36 may decay the output current supplied by the DC/AC power inverter 32 to the electric machine 17 to zero. Also for example, the inverter controller 36 may notify the engine controller 34 that the electric machine 17 is in free spinning mode through CAN bus 38 (FIG. 2).

In response, the engine controller 34 may enable its speed control function and may notify inverter controller 36 through the CAN bus 38 that the engine controller 34 has taken over the speed control for the split gear/power train 18. The engine controller 34 regulates the rotational speed of the split gear/power train 18 to approximate a threshold value (e.g., 1800 rpm±a tolerance at the motor shaft end).

When the motor's shaft speed of the electric machine 17 reaches a threshold value (e.g., 1750 rpm for a 4 pole motor), the inverter controller 36 changes the operating mode for the electric machine 17 from the free spinning mode to a generation operation mode. As part of changing operating modes the inverter controller 36 may perform a number of acts. For example, the inverter controller 36 may check the flag that indicates whether the engine controller 34 has taken over the speed control of the split gear power train 18 to determine if the flag is true, (e.g., flag set to logic value "1"). Also for example, the inverter controller 36 checks the shaft speed of the motor to determine whether the shaft speed has reached a threshold (e.g., 1800 rpm±a tolerance). If the flag is logic value "1" and motor shaft speed is 1800 rpm±a tolerance, the inverter controller 36 sets that current torque component (i.e., q-component) reference equal to zero and the current magnetizing component (i.e., d-component) reference equal to a reference value for the electric machine 17.

The inverter controller 36 enables the DC/AC power inverter 32 to output phase currents to the electric machine 17, which is operated as a primary generator. The inverter controller 36 controls the output current from the DC/AC power inverter 32 to the electric machine 17 in such a way that the torque component of the current equals zero and the magnetizing component of the current equals the reference value for the electric machine 17. This function can be realized based on the sensed motor shaft speed/position signals, sensed inverter output phase voltages, sensed phase currents and vector control algorithms, etc. That is, the supply of the AC real power to the electric machine is halted.

The inverter controller 36 enables its internal voltage regulator. The input to the voltage regulator is the error of preset voltage magnitude and sensed voltage magnitude of the generation system. The output from the voltage regulator is used to adjust the preset current magnetizing component reference so as to adjust magnetizing current for the motor. The magnetizing current level is regulated so that the induced voltage (back EMF) in the motor shall make the generation system's voltage equal to the preset value.

The inverter controller 36 checks the magnitude and frequency of the output voltage via voltage sensors VS1, VS2, VS3 (FIG. 3 or 4). If the magnitude and frequency of the output voltage are equal to preset values (e.g., 120V, 60 Hz within preset tolerance), the inverter controller 36 closes load switch SW2 in SPC module 50 (FIG. 3 or 4), to deliver electrical power to the load 52. Thus, the system functions as a power generator, the engine 14 providing input power to the electric machine 17 operating as a generator and the DC/AC power inverter 32 providing reactive power to the electric machine 17 operating as a generator. The voltage regulator in the inverter controller 36 controls the magnetizing current for the induced voltage in the electric machine 17 operating as a generator so as to control the output voltage of the generator system.

The inverter controller 36 continues to sense the power generation system's frequency and transfers the sensed frequency to the engine controller 34 via CAN bus 38 (FIGS. 1 and 2). Based on the desired frequency for the power generation system and the sensed frequency from the inverter controller 36, the power train speed controller in the engine controller 34 regulates the speed of the power train (i.e., the generator's shaft speed) so as to control the output frequency of the generator system.

In power generation operation mode, the electric machine 17 provides electrical power to the load 52 and the engine 14 directly supplies energy/power (torque via the split gear/power train 18) to the electric machine 17 now operating as a generator. As described in the above sections, the DC/AC power inverter 32 in the system provides magnetizing current, i.e., reactive power, to the electric machine 17 operating as a generator and regulates the magnetizing current to regulate the output voltage of the power generation system. If the DC/AC power inverter 32 supplies only reactive power to the electric machine 17, and hence to the load 52, the DC/AC power inverter 32 does not absorb energy from the power storage device 30 so that the engine 14 does not need to supply energy (real power) to the power storage device 30 (FIG. 2).

However, through proper controls, the DC/AC power inverter 32 can also provide real and/or reactive power to the load 52. When the DC/AC power inverter 32 outputs real power to the load 52, DC/AC power inverter 32 absorbs energy from the power storage device 30 in the power generation system (FIG. 3 or 4). The energy (real power) supplied to the power storage device 30 also comes from the engine 14 through an AC generator 24 and an AC/DC power converter 28 (FIG. 2).

With the above power delivery features of the DC/AC power inverter 32, the output power of the power generation system 12 can come from the electric machine 17 only, or from both the electric machine 17 and the AC generator 24 via the power storage device 30 and DC/AC power inverter 32. The features may provide the generation system with a higher continuous or short time power rating, to improve output power quality, etc.

The topology illustrated in FIG. 3 can handle unbalanced loads very well through the Delta-Wye-n transformer 66 at the output of the power generation system. The transformer 66 absorbs large amounts of the unbalanced component (zero-sequence component) in the A winding and less unbalanced current flows into the electric machine 17 so that less unbalance voltage effect occurs at output terminals of the electric machine 17. The transformer 66 also provides electric potential isolation between the generation system and load 52. However, it is desirable to select a transformer 66 with a rating of 110% of expected output power rating of the generation system. Consequently, the transformer 66 may be large, heavy and expensive.

The topology illustrated in FIG. 4 can handle unbalanced loads through connecting the neutral line N of the electric machine 17 to the neutral terminal at the load side. All of the unbalanced current components (including zero-sequence component) flow into the electric machine 17. The power generation system can provide decent voltage balance among phases if the unbalance load is controlled under a certain level (e.g., less than approximately 20% load difference over average phase load among three phases). Under severe unbalanced load conditions this power generation system 12 may have poorer voltage balance among three phases than the power generation system adopting the topology illustrated in FIG. 3. However, if an off-vehicle transformer is needed for special applications or is available at the customer site, an off-vehicle transformer can be conveniently connected between the load 52 and the output terminals of the power generation system in FIG. 4. The topology illustrated in FIG. 4, which omits the transformer 66, may be more suitable for portable power generation equipment installed on a vehicle 10.

Figure 5:
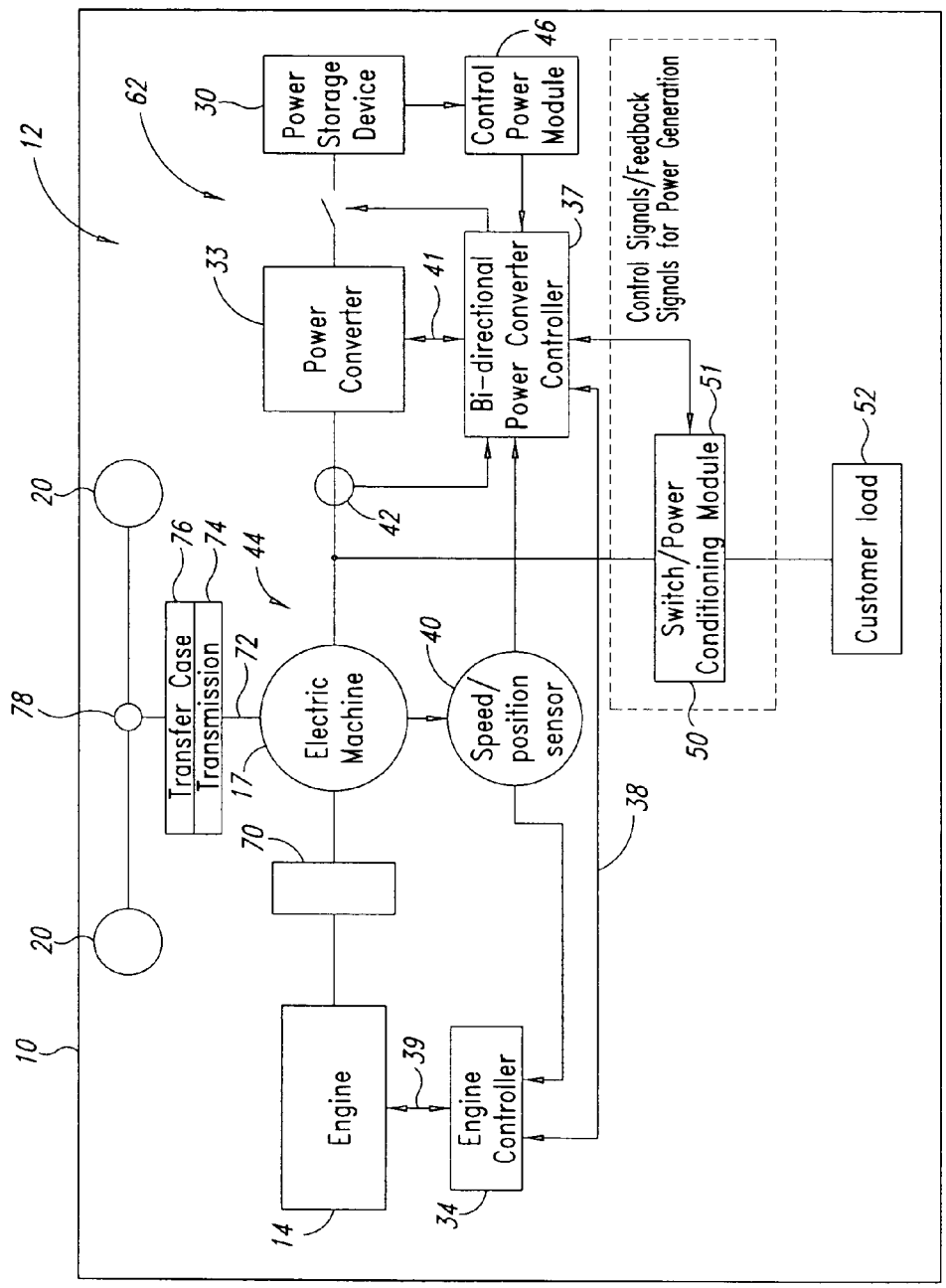
FIG. 5 is a block diagram of a hybrid electric vehicle comprising a switch/power conditioning module to provide onboard AC power, according to another illustrated embodiment, omitting an AC generator and AC/DC converter, and where an engine drives an electric machine which is coupled to drive a transmission to propel the hybrid electric vehicle.

FIG. 5 shows another embodiment of a hybrid electric vehicle 10 employing a new standby power generation topology which can be used with conventional parallel hybrid electric vehicles topologies. The power train system 12 illustrated in FIG. 5 includes the same or similar components as the conventional power train system 12 illustrated in FIG. 2. Common structures and acts are identified by the same reference numbers. Only significant differences in operation and structure are described below.

The embodiment illustrated in FIG. 5 replaces the split gear/power train 18 with a flex coupling 70 between the engine 14 and electric machine 17. The embodiment of FIG. 5 drives the wheels 20 from the electric machine 17 via a drive shaft 72, transmission 74, and transfer case 76, and/or universal 78. While shown driving one axle and a pair of wheels 20, the electric machine 17 may drive multiple axles and/or sets of wheels 20, or may drive other forms of propulsion, for example a propeller of a boat or airplane (not shown).

The embodiment of FIG. 5 also omits the AC generator 24 and AC/DC power converter 28. The embodiment of FIG. 5 replaces the DC/AC power inverter 32 with a bi-directional power converter 33, and replaces the inverter controller 36 with a bi-directional power converter controller 37. The power storage device 30 may be charged via operation of the bi-directional power converter 33 as a rectifier, for example, in a regenerative braking mode or when the electric machine 17 is driven by the engine 14. Additionally, or alternatively, the power storage device 30 may be charged via a hookup to an external electrical power source when available.

FIG. 6 shows a portion of the power train 12 including an electrical circuit topology suitable for use in the SPC module 50 of FIG. 5, according to another illustrated embodiment. The embodiment illustrated in FIG. 6 includes many of the same or similar components as the embodiment illustrated in FIG. 4. Common structures and acts are identified by the same reference numbers. Only significant differences in operation and structure are described below.

In particular, the embodiment of FIG. 6 omits the AC generator 24, AC/DC power converter 28 and associated buses that were present in the embodiment of FIG. 4, thereby simplifying the structure, advantageously reducing the weight, and associated cost.

Figure 7:
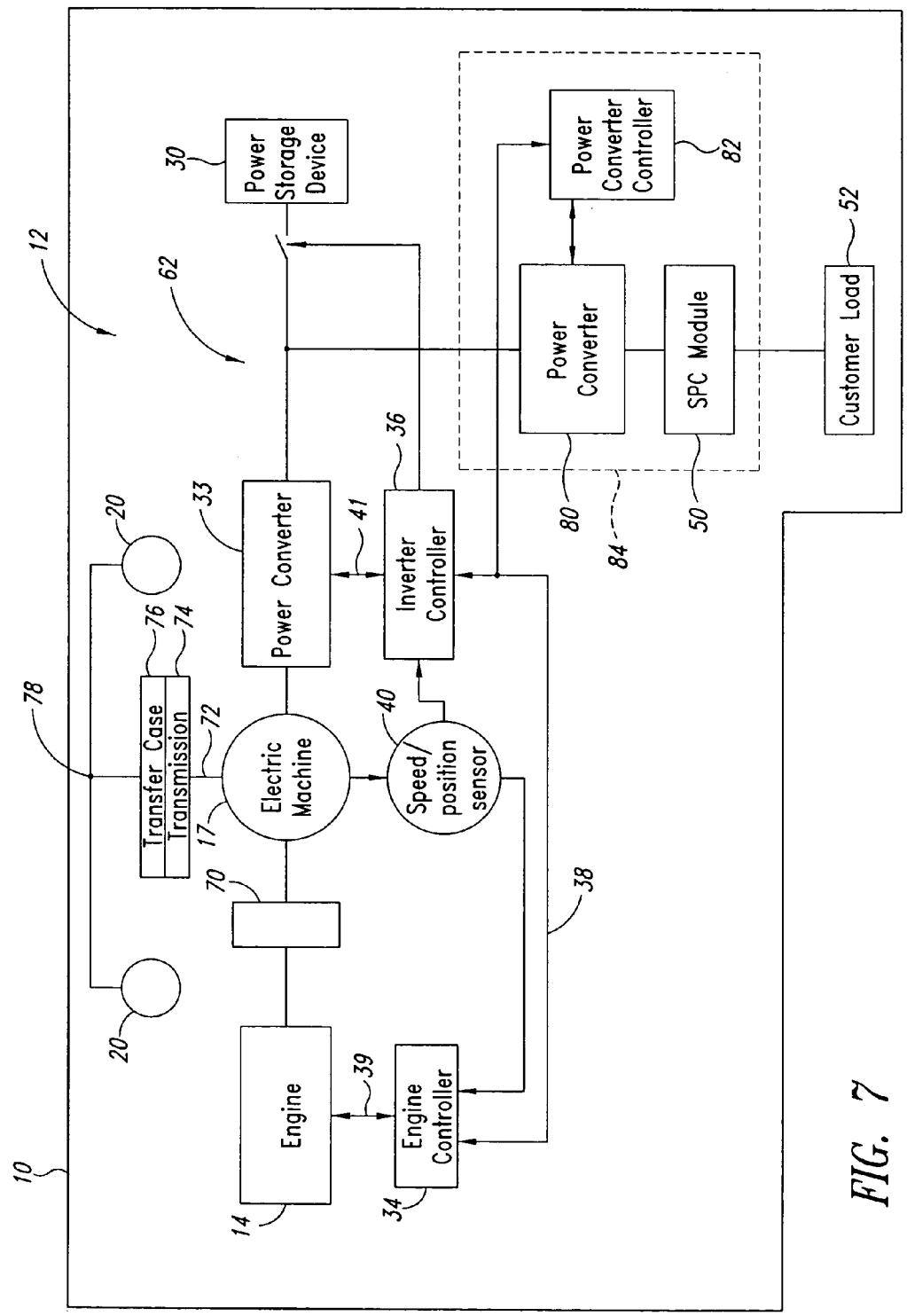
FIG. 7 is a block diagram of a hybrid electric vehicle comprising a switch/power conditioning module to provide onboard AC power, according to yet another illustrated embodiment, including a second AC/DC power converter and controller operable to supply AC power to a load.

FIG. 7 shows another embodiment of a hybrid electric vehicle 10 employing a new standby power generation topology which can be used with conventional parallel hybrid electric vehicles topologies. The power train system 12 illustrated in FIG. 7 includes the same or similar components as the conventional power train system 12 illustrated in FIG. 5.

Common structures and acts are identified by the same reference numbers. Only significant differences in operation and structure are described below.

The embodiment of FIG. 7 includes a second Power converter 80 electrically coupled to the DC power bus 62, and a second power converter controller 82 coupled to receive information and/or instructions via CAN bus 38 and to provide control signals to the second Power converter 80. The second Power converter 80 and second power converter controller 82 may form part of a module 84, that includes the SPC module 50.

In the embodiment of FIG. 7, the engine 14 provides the power to rotate the electric machine 17, which acts as a generator. The first bi-directional power converter 33 is operated as a rectifier, rectifying the AC power produced by the electric machine 17 to supply DC power to the DC power bus 62. The second Power converter 80 is operated as an inverter, inverting the DC power on the DC power bus 62 to supply AC power (e.g., 60 Hz, 120V AC) to the load 52. As a general power source, the second Power converter 80 should be capable of handing unbalanced loads. Where the first power converter 33 is used for motor driving applications with balanced 3-phase loads using only 3 wire outputs, the first power converter 33 will not be able to handle unbalanced loads well. Hence, the first and second power converters 33, 80 will have different designs.

Figure 8:
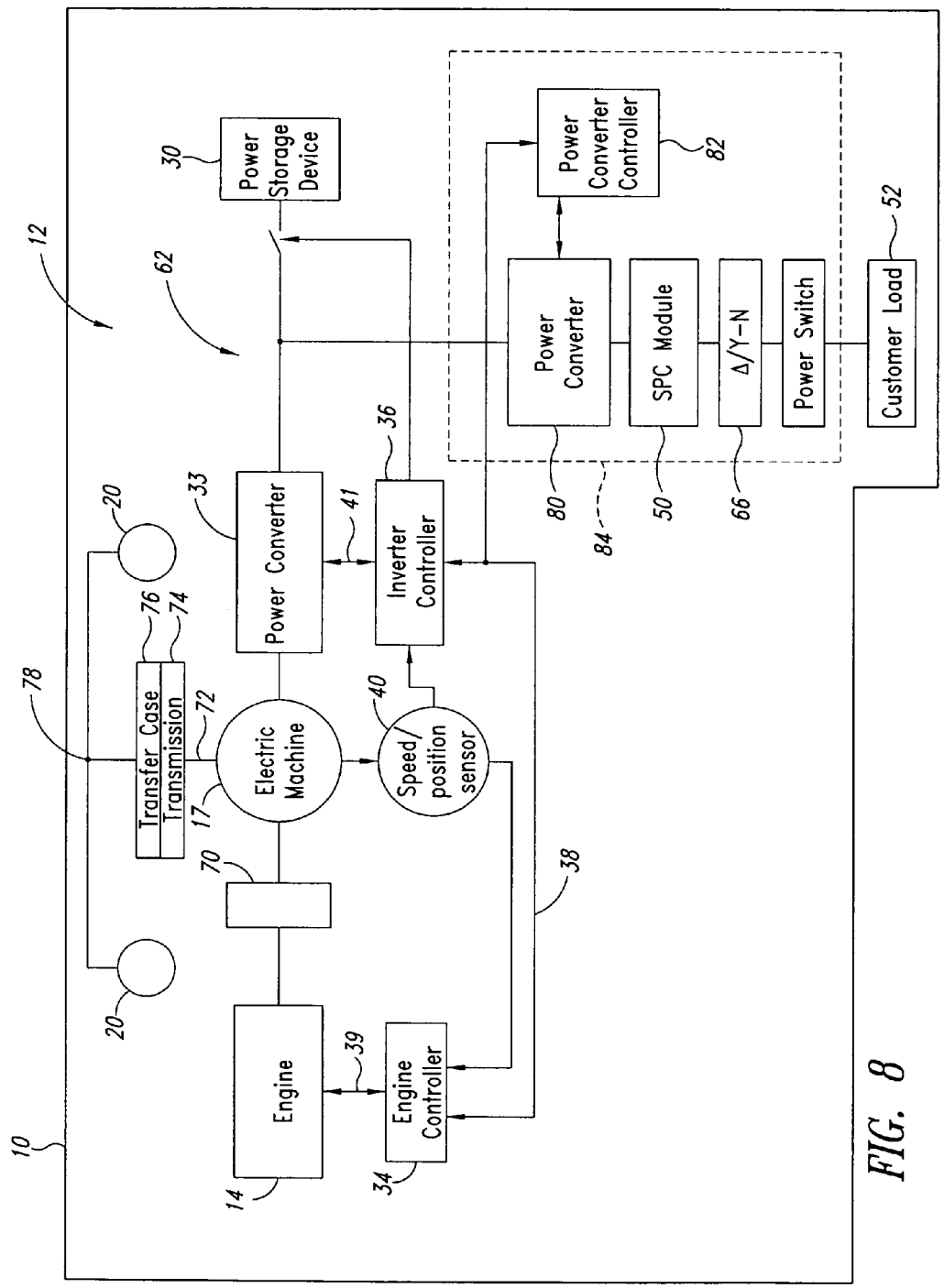
FIG. 8 is a block diagram of a hybrid electric vehicle comprising a switch/power conditioning module to provide onboard AC power, according to still another illustrated embodiment, employing a transformer between the second AC/DC power converter and the load.

FIG. 8 shows another embodiment of a hybrid electric vehicle 10 employing a new standby power generation topology which can be used with conventional parallel hybrid electric vehicles topologies. The power train system 12 illustrated in FIG. 8 includes the same or similar components as the conventional power train system 12 illustrated in FIG. 7. Common structures and acts are identified by the same reference numbers. Only significant differences in operation and structure are described below.

The embodiment of FIG. 8 adds a Delta-Wye transformer with neutral output to the output terminals of the second Power converter 80. This advantageously allows the same design to be employed for both the first and the second power converters 33, 80. The transformer 66 may be designed with the capability to handle unbalanced loads.

As discussed above, the new topologies advantageously add a high power standby generator function to the hybrid electric vehicle with a minimum of additional hardware components. This is accomplished by making use of many components already included in a hybrid electric vehicle architecture, for example including: the engine, along with the associated cooling system and all exhaust system treatments for noise and pollutants; drive assist motor; power inverter; and power train control system. Only switching and power conditioning on the standby load components are added to the hybrid electric vehicle.

The above describe topologies advantageously allow the full capacity of the existing engine to be used for power generation. The above described topologies advantageously make use of the existing vehicle components in a much more efficient manner than prior approaches. Power is directly transformed from rotational energy into AC power (e.g., 60 Hz) without additional linkages or mechanisms. The above described topologies advantageously do not require significant changes to the existing power train designs used in existing hybrid electric vehicles.

The topologies combine a traditional engine driven type generator and an electronic power converter type generator to form a new type of power generation system, a "hybrid power generation system". As compared to traditional engine driven generators or electronic power converter type generation systems, the "hybrid power generation system" may have better performances in following areas: improved harmonics in voltage quality, improved duration of overload capability, improved voltage regulation, and faster transient performance.

The above described topologies advantageously can also be employed in a variety of hybrid vehicle architectures, such as a parallel hybrid drive system in which the motor is directly coupled to the engine and used as a starter/generator/motor-assist unit, or possibly in series hybrid drive systems. The above described topologies could potentially make use of the energy stored in the hybrid system battery to support short duration increases in electrical loads. Further, by virtue of being incorporated into a hybrid electric vehicle, the power generation system is easily transported to any location which can be reached by the vehicle 10.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other power generation systems, not necessarily the exemplary hybrid electrical vehicle based system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers, as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all power generation systems and methods that operate in accordance with the claims. Accordingly, the invention is not limited by the disclosure, but instead its scope is to be determined entirely by the following claims.

The invention claimed is:

1. A method for operating a hybrid electric vehicle, comprising:
  converting direct current (DC) power received from a DC power storage device into alternating current (AC) real power and AC reactive power with a power inverter;
  operating an electric machine with the AC real power to produce torque that is used to start an engine;
  after the engine is started, controlling the power inverter such that the electric machine is operable in a generating mode wherein the electric machine receives at least AC reactive power from DC power received from the DC power storage device, and that DC power received from the DC power storage device is converted into AC current having a torque current component equal to zero, within a first preset tolerance, and having a magnetizing current component equal to a reference current value of the electric machine, within a second preset tolerance; and
  after an output voltage of the electric machine is at a preset voltage value and after an AC frequency of the electric machine is at a preset frequency value, operating the electric machine as a generator to generate AC power and operating a switch/power conditioning module to provide the generated AC power to a load.

2. The method of claim 1 wherein operating the electric machine with the AC real power to produce torque comprises:
  providing torque produced by the electric machine to a power train; and
  transferring the produced torque from the power train to the engine so that the engine is started.

3. The method of claim 1 wherein after the engine is started and the electric machine is operated in the generating mode, the electric machine receives only AC reactive power from the DC power storage device.

4. The method of claim 1 wherein after the engine is started, comprising:
  operating the electric machine in a free spinning mode; and
  operating a shaft of the engine at a rotational speed such that the AC frequency of the electric machine is at the preset frequency value.

5. The method of claim 1 wherein controlling the power inverter such that the magnetizing current component is equal to the reference current value comprises:
  regulating the magnetizing current component so that an induced back EMF voltage in the electric machine causes the output voltage of the electric machine to equal the preset voltage value, within a third preset tolerance.

6. The method of claim 1, after the engine is started, further comprising:
  providing torque from the engine to an AC generator so that an amount of AC power is generated by the AC generator; and
  converting the amount of AC power generated by the AC generator into an amount of DC power that is stored into the DC power storage device.

7. A power system for a hybrid electric vehicle, comprising:
  a power train operable to propel the hybrid electric vehicle;
  an electric machine physically coupled to the power train, operable as a motor to provide torque to the power train, and operable as a generator to produce alternating current (AC) power in response to receiving torque from the power train;
  an engine physically coupled to the power train, operable to provide torque to the power train, and operable to receive torque from the power train;
  a power inverter electrically coupled between a power storage device and the electric machine, the power inverter operable to transform direct current (DC) power received from at least the power storage device into AC real power and AC reactive power;
  a switch and power conditioning module electrically couplable to the electric machine, and operable to selectively supply a load;
  a DC/AC power converter electrically coupled between the power inverter and the load;
  a DC/AC power converter controller coupled to the DC/AC power converter; and
  an inverter controller controllably coupled to the power inverter, such that:
    when starting the engine, the inverter controller operates the power inverter to convert DC power received from the power storage device into the real AC power that is delivered to the electric machine so that the electric machine provides torque to the power train to start the engine;
    after starting the engine, the inverter controller operates the power inverter to convert DC power received from the power storage device into the reactive AC power so that the electric machine is operated in a generating mode wherein the electric machine receives AC reactive power; and
    after an output voltage of the electric machine is at a preset voltage value and after an AC frequency of the electric machine is at a preset frequency value, the switch/power conditioning module is operated to source the load with AC power, wherein the AC power is provided from the electric machine; wherein in response to receiving a signal from the inverter controller that is communicated after the electric machine is operated to the preset voltage value and the preset frequency value, the DC/AC power converter controller operates the DC/AC power converter to convert received DC power into AC power that is sourced to the load.

8. The hybrid power system of claim 7, further comprising:
  an engine controller controllably coupled to the engine and communicatively coupled to the inverter controller, and operable to control the engine in response to signals from the inverter controller, such that:
    when the engine is started, the engine controller starts the engine in response to the power train receiving torque from the electric machine;
    after the engine is started, the engine controller operates the engine at a revolution per minute (RPM) speed such that the electric machine operating in the generating mode is operated to the preset frequency value.

9. The hybrid power system of claim 8 wherein after the output voltage of the electric machine is at the preset voltage value and after the AC frequency of the electric machine is at the preset frequency value, the engine controller operates the engine such that torque is provided to the power train, and wherein a portion of the torque provided to the power train is received by the electric machine and used to provide the AC power to the load.

10. The hybrid power system of claim 7 wherein the switch/power conditioning module comprises:
- a Delta-Wye transformer with a set of three primary windings in a Delta configuration electrically coupled to the electric machine, and a set of three secondary windings in a Wye configuration electrically coupled to the load;
- a set of three inductors electrically coupled between the primary windings and the electric machine; and
- a set of three capacitors electrically coupled between the primary windings.

11. The hybrid power system of claim 7 wherein the switch/power conditioning module further comprises an enable/disable switch responsive to the inverter controller such that the enable/disable switch electrically decouples the load from the electric machine at least when the engine is started, and such that the enable/disable switch electrically couples the load to the electric machine at least when the electric machine is operated to the preset voltage value and the preset frequency value.

12. The hybrid power system of claim 7, further comprising:
- a power take off physically coupled to the power train;
- an AC generator physically coupled to the power take off and operable to generate AC power in response to receiving torque from the power take off; and
- an AC/DC power converter electrically coupled between the AC generator and the power storage device, and operable to transform generated AC power produced by the AC generator into DC power for storage by the power storage device.

13. The hybrid power system of claim 7 wherein the power inverter is bi-directionally operable by the inverter controller as an inverter and operable by the inverter controller as a rectifier, such that AC power generated by the electric machine is converted into the DC power stored by the power storage device in response to the power inverter being operated as the rectifier.

14. The hybrid power system of claim 7, further comprising:
- a flex coupling replacing the power train and physically coupling the engine and the electric machine; and
- a transmission mechanically coupling the electric machine to a set of wheels.

15. The hybrid power system of claim 7 wherein the engine is an induction motor.

16. A system of operating a hybrid electric vehicle, comprising:
- means for converting direct current (DC) power received from a DC power storage device into alternating current (AC) real power and AC reactive power with a power inverter;
- means for operating an electric machine with the AC real power to produce torque that is used to start an engine;
- means for controlling the power inverter after the engine is started such that the electric machine is operated in a generating mode wherein the electric machine receives at least AC reactive power from DC power received from the DC power storage device and the DC power received from the DC power storage device is converted into AC current having a torque current component equal to zero, within a first preset tolerance, and having a magnetizing current component equal to a reference current value of the electric machine, within a second preset tolerance; and
- means for operating the electric machine as a generator to generate AC power and operating a switch and power conditioning module to provide the generated AC power to a load after an output voltage of the electric machine is at a preset voltage value and after an AC frequency of the electric machine is at a preset frequency value.

17. A method for operating a hybrid electric vehicle, comprising:
- converting direct current (DC) power received from a DC power storage device into alternating current (AC) real power and AC reactive power with a power inverter;
- operating an electric machine with the AC real power to produce torque that is used to start an engine;
- after the engine is started, operating the electric machine in a free spinning mode;
- controlling the power inverter such that DC power received from the DC power storage device is converted into AC current having a torque current component equal to zero within a preset tolerance, and having a magnetizing current component equal to a reference current value of the electric machine with at least the AC reactive power is provided to the electric machine when a motor shaft of the electric machine is rotating at a speed at least equal to a preset speed, within a preset tolerance; and
- after an output voltage of the electric machine is at a preset voltage value and after an AC frequency of the electric machine is at a preset frequency value, operating the electric machine as a generator to generate AC power and operating a switch and power conditioning module to provide the generated AC power to a load.

18. The method of claim 17, wherein operating the electric machine in the free spinning mode comprises:
- halting a supply of the AC real power to the electric machine.

19. A power system for a hybrid electric vehicle, comprising:
- a power train operable to propel the hybrid electric vehicle;
- an electric machine physically coupled to the power train, operable as a motor to provide torque to the power train, and operable as a generator to produce alternating current (AC) power in response to receiving torque from the power train;
- an engine physically coupled to the power train, operable to provide torque to the power train, and operable to receive torque from the power train;
- a power inverter electrically coupled between a power storage device and the electric machine, the power inverter operable to transform direct current (DC) power received from at least the power storage device into AC real power and AC reactive power;
- a switch and power conditioning module electrically couplable to the electric machine, and operable to selectively supply a load; and
- an inverter controller controllably coupled to the power inverter, such that:
- when starting the engine, the inverter controller operates the power inverter to convert DC power received from the power storage device into the real AC power that is delivered to the electric machine so that the electric machine provides torque to the power train to start the engine;
- after starting the engine, the inverter controller operates the power inverter to such that DC power from the DC storage device is converted into AC current having a torque component equal to zero, within a first preset tolerance so that the electric machine operates in a free spinning mode and having a magnetizing current component equal to a reference current value of the electric machine within a second preset tolerance;

after a motor shaft of the electric machine that is physically coupled to the power train is rotating at a speed greater than a preset speed, the inverter controller operates the power inverter to convert DC power received from the power storage device into the reactive AC power so that the electric machine is operated in a generating mode wherein the electric machine receives AC reactive power; and after an output voltage of the electric machine is at a preset voltage value and after an AC frequency of the electric machine is at a preset frequency value, the switch/power conditioning module is operated to source the load with AC power, wherein the AC power is provided from the electric machine.

* * * * *